Aug. 5, 1969   A. QUENOT   3,458,937
FOLDING MEASURING INSTRUMENT INCORPORATING IMPROVED SPRINGS
Filed Sept. 15, 1967   2 Sheets-Sheet 1
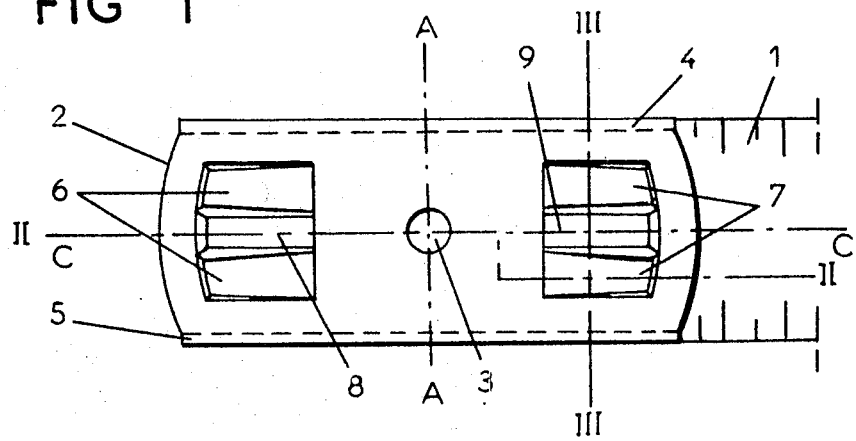
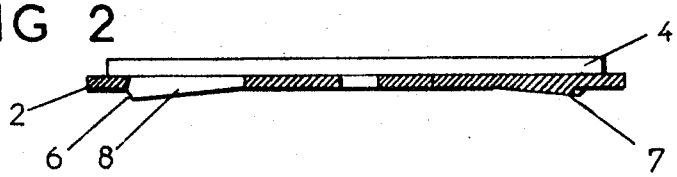
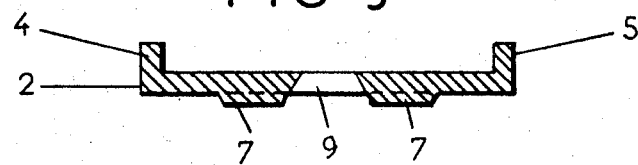
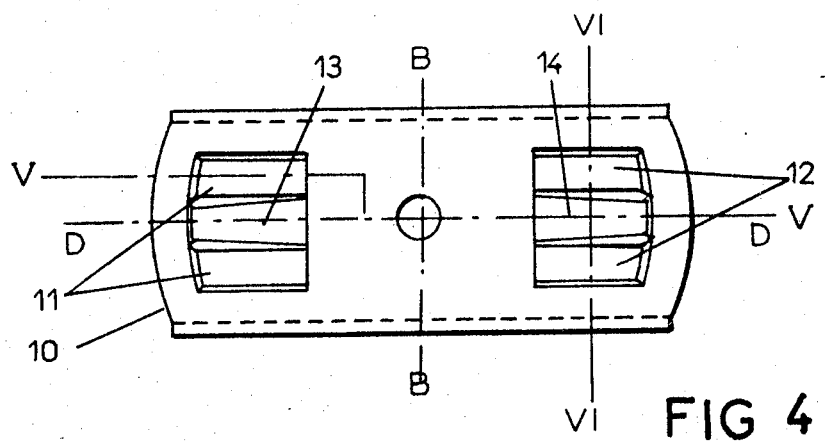

FIG. 5
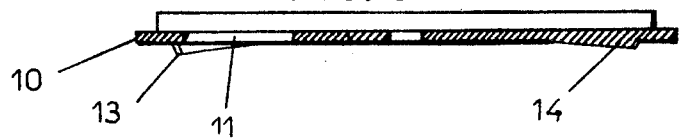
FIG. 6
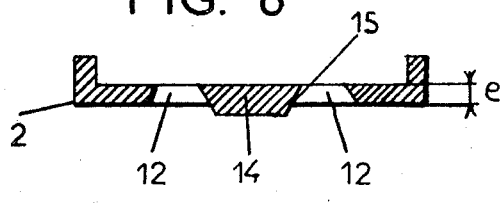
FIG. 7
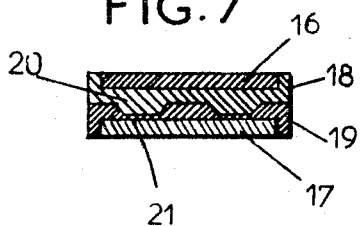
FIG 8
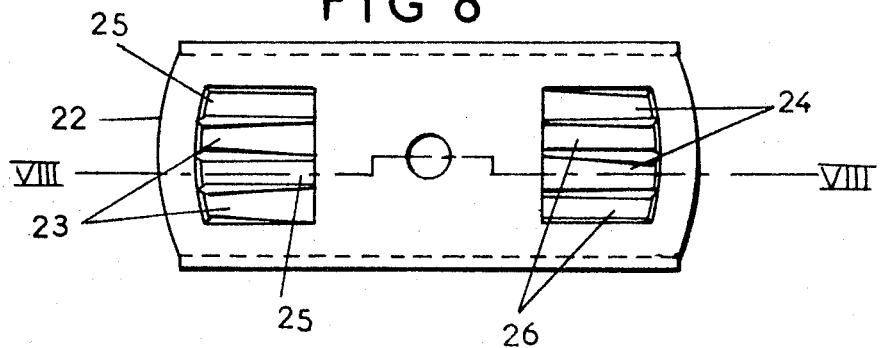
FIG 9
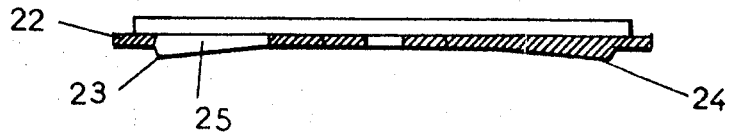
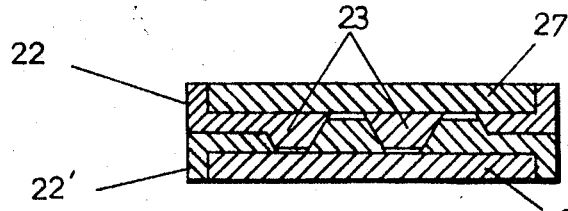
FIG 10

United States Patent Office 3,458,937
Patented Aug. 5, 1969

3,458,937
FOLDING MEASURING INSTRUMENT INCORPORATING IMPROVED SPRINGS
Andre Quenot, Besancon, Doubs, France, assignor to Quenot & Cie S.a.r.l., Besancon, Doubs, France, a company of France
Filed Sept. 15, 1967, Ser. No. 667,895
Claims priority, application France, Apr. 28, 1967, 104,667
Int. Cl. B43l 7/06; G01b 3/06
U.S. Cl. 33—118                                    1 Claim

ABSTRACT OF THE DISCLOSURE

The folding measuring instrument has alternate pairs of bosses and openings on each side of the pivot on each linkage member with a pair of openings on one side of the pivot aligned with a pair of bosses on the other side of the pivot.

---

Linear measuring instruments, for example foldable rules of wood or metal, comprise a certain number of links pivoted two by two on rivets or pivots located at the extremity of these links.

In order to avoid the fact that these instruments when they are unfolded, fold back during measurement, under the effect of their weight or of any other factor, and to ensure the links remain in good alignment, the extremities of certain links have been provided with one or two bosses, the sections of the other links facing them having corresponding hollows.

These bosses as well as the corresponding hollows, are generally positioned on either side of the pivot or pivoting rivet which permits the clamping of the links in the folded as well as in the unfolded state.

These bosses generally have either a rounded shape co-operating with a complementary hollow of the adjacent link, or an elongated substantially rectangular shape often with rounded angles.

The combination of these bosses with the corresponding hollows gives a certain resiliency to the assembly thus formed. These combinations have been made either by bosses and embossed hollows in the links themselves, or by recessed linkage members of brass, steel brass or other metal added to the link, or by recess linkage members made of moulded plastic material and added to the link.

The linkage members thus made have mainly the two following drawbacks:

On the one hand they occasioned excess thickness of the instrument in particular in case of double or triple folding meters, owing to the thickness of the linkage members added to the links.

Additionally, they do not permit a prolonged maintenance of the rigidity of the unfolded rule. In fact, certain folding rule, even when new flex when unfolded when maintained endwise by a terminal link. The others have a tendency to fold back in bent condition when most extended use and this as a result of the play which can occur in the pivots.

Consequently, the invention proposes to provide improved springs permitting simultaneously a reduced thickness for the folding measuring instrument, in increased rigidity upon unfolding and an easier manufacture.

The folding measuring instrument according to the invention comprises a series of graduated sections, said sections having adjacent ends provided with identical co-operating linkage members, said sections being pivoted together at said adjacent ends by a pivot passing through the centre of said linkage members, said members having side flanges directed in one direction and gripping the side edges of said sections; said linkage members having spaced pairs of bosses assymmetrically alternated with adjacent openings, said bosses being directed in the upward direction of said flanges, said linkage members being mounted on said sections in such a way that the bosses of one member engage in the openings of the other member.

The invention will be better understood by referring to the accompanying description made by way of non-limiting example and to the accompanying drawing in which:

FIGURE 1 is a front view of its spring according to one embodiment of the invention;
FIGURE 2 is a cross-section taken along line II—II of the spring according to FIGURE 1;
FIGURE 3 shows a cross-section taken along line III—III of the spring of FIGURE 1;
FIGURE 4 shows a front view of the spring of the link or graduated section adjacent to that carrying the spring of FIGURE 1;
FIGURE 5 is a cross-sectional view taken along line V—V of the spring of FIGURE 4;
FIGURE 6 is a cross-sectional view taken along line VI—VI of the spring of FIGURE 4;
FIGURE 7 shows a transversal cross-section of two adjacent springs one of which has only male bosses and the other has only female orifices;
FIGURE 8 shows a front view of another embodiment of the invention;
FIGURE 9 shows a cross-sectional view taken along line VIII—VIII of the spring of FIGURE 8;
FIGURE 10 shows a transversal cross-section of two graduation sections encased according to the embodiment of FIGURE 8.

Reference is made to FIGURES 1, 2 and 3.

Graduated section 1 of the folding measuring instrument carries at its extremity a linkage member 2, made for example of a synthetic material known under the trademark name of Delrin. Said section 1 has, as well as spring 2, an opening 3 through which passes the rivet or pivot which connects it to its adjacent section. Two side flanges 4 and 5 permit a better securing of linkage member 2 on section 1.

Linkage member 2 has two pairs of bosses or indentations 6 and 7. The two bosses 6 are located on either side of an opening 8 while the two bosses 7 are located on either side of opening 9.

The assembly of bosses 6 and orifice 8 and the assembly of bosses 7 and orifice 9 are symmetrical relative to plane A—A perpendicular to section 1 and passing by the pivoting axe and relative to the plane C—C, itself perpendicular to the previously mentioned plane A—A.

Bosses 6 and 7 and slots 8 and 9 have elongated shapes and surfaces having various slopes. These dimensional characteristics are selected to readily permit simultaneously a good fit and it is diverse evident that the shapes for the bosses, slots and cutouts can be used. Referernce is made to FIGURES 4, 5 and 6.

Spring 10 is located in front of linkage member 2 and has the same general shape. It has two pairs of cutouts 11 and 12 located respectively around two bosses 13 and 14. The assembly of cutouts 11 and bosses 13 and of cutouts 12 and boss 14 are symmetrical relative to plane B—B perpendicular to the section and also relative to the plane D—D perpendicular to the previously mentioned plane.

The shape of cutouts 11 and 12 are complementary to the shapes of bosses 6 and 7 while the shapes of bosses 13 and 14 are complementary to the shapes of cutouts 8 and 9. In such a way there is obtained a perfect fit of the two adjacent sections when unfolded as when folded.

It is evident that the number of these bosses and cutouts can be as varied as their shapes and position.

Owing to the interpenetration of springs 2 and 10 it is possible to arrive at the interfitting height which can be up to twice the thickness $e$ of the core of each of the springs while with a conventional spring this interfitting height is at most equal to $e$.

By increasing the number of cooperating male and female elements on the two springs the number of edges such as 15 which are subjected to wear during operation is increased. This wear is thus reduced since it is distributed on a greater number of edges. This also permits if a greater rigidity is not desired to decrease the height of the bosses and the depth of the slots and thus permits a space saving in the thickness of the springs and consequently of the instrument.

Naturally this increase in the number of edges such as 15 can also extend to conventional springs having each only male bosses or female cutouts or slots.

Reference is made to FIGURE 7 by way of example.

Linkage member 18 of section 16 is related to conventional springs but instead of having only a single male boss on each side of the pivot (not shown) it has a certain number thereof such as two bosses 20.

Linkage member 19 of branch 17 has female slots 21 equal in number to bosses 20.

This disposition if it does not increase the height of interfitting permits nevertheless a better hold owing to the increase of edges and causes less wear of these edges.

Linkage members 22 as shown in FIGURES 8-10 has a general shape similar to the previously described springs having two pairs of bosses 23 and 24 respectively alternated with two pairs of cutouts 25 and 26. The assembly of the bosses and the cutouts 23 and 25 and of the bosses and cutouts 24 and 26 are this time only symmetrical relative to the pivot of the section.

This disposition permits to use for all sections a single type of linkage member since it is evident that a spring 22' as shown in FIGURE 10 identical to spring 22 and located on section 27' adjoining branch 27 which bears said linkage member 22 will latch therewith when extended as when folded.

There is thus obtained a great simplification in fabrication since it is only necessary to make a single type of spring. Naturally all modifications of forms, positions and number of cutouts or slots and of bosses indicated in the preceding examples are possible, the only condition being that they must be disposed symmetrically relative to the pivoting axis.

Although the invention has been described with respect to a particular embodiment thereof, it is understood that the same is in no way limited thereto and that there can be brought to it diverse modifications of shapes and of materials without departing thereby from the scope of the invention as defined in the appended claim.

What is claimed is:

1. A folding measuring instrument comprising a series of graduated sections, said sections having adjacent ends provided with identical cooperating, resilient linkage members, said sections being pivoted together at said adjacent ends by a pivot passing through the center of said linkage members, said members having side flanges directed in one direction and gripping the side edges of said sections; said linkage members each having alternate pairs of bosses and openings on each side of said pivot, a pair of openings on one side of said pivot being aligned with a pair of bosses on the other side of said pivot, said bosses being directed in the opposite direction as said flanges, said linkage members being superimposed on one another between adjacent sections and mounted on said sections in such a way that the bosses of one member engage in the openings of the other member.

References Cited

UNITED STATES PATENTS 2,515,622   7/1950   Wild _____ 33—120
2,655,730   10/1953  Proctor _____ 33—120

FOREIGN PATENTS 880,215   6/1953   Germany.
7,501   11/1893   Switzerland.

HARRY N. HAROIAN, Primary Examiner

U.S. Cl. X.R.

33—105